United States Patent

Uetsuka et al.

Patent Number: 5,832,154
Date of Patent: Nov. 3, 1998

[54] OPTICAL DEVICE FORMED WITH GRATING THEREIN, ADD/DROP FILTER USING SAME, AND METHOD OF FABRICATING SAME

[75] Inventors: Hisato Uetsuka; Hideaki Arai, both of Ibaraki-ken, Japan

[73] Assignee: Hitachi Cable, Ltd., Tokyo, Japan

[21] Appl. No.: 953,997

[22] Filed: Oct. 20, 1997

Related U.S. Application Data

[62] Division of Ser. No. 703,629, Aug. 29, 1996.

[30] Foreign Application Priority Data

Feb. 19, 1996 [JP] Japan ..................................... 8-30656
Feb. 19, 1996 [JP] Japan ..................................... 8-30657

[51] Int. Cl.$^6$ .................................................. G02B 6/34
[52] U.S. Cl. .......................................................... 385/37
[58] Field of Search .................................. 385/33–37, 14, 385/129, 130, 131, 146, 901; 359/328, 556, 802, 803, 566, 569, 900; 430/290, 321

[56] References Cited

U.S. PATENT DOCUMENTS

| | | | |
|---|---|---|---|
| 4,830,447 | 5/1989 | Kamiyama et al. | 385/130 |
| 5,323,477 | 6/1994 | Lebby et al. | 385/129 |
| 5,367,588 | 11/1994 | Hill et al. | 385/37 |
| 5,745,617 | 4/1988 | Starodubov et al. | 359/566 |

FOREIGN PATENT DOCUMENTS

02 B 5/18  10/1993  Germany .
7-140311   6/1995   Japan .

*Primary Examiner*—Akm E. Ullah
*Attorney, Agent, or Firm*—McDermott, Will & Emery

[57] ABSTRACT

A width of a core in an optical waveguide is decreased in accordance with a value of a predetermined equation, as a distance of a position of the core to the center position thereof is decreased. Consequently, a rectangular spectrum property having no ripple is obtained on a lower wavelength side in a reflection grating. In addition, the width of the core is changed at the position Z in the direction of light propagation, while a UV light is radiated to the core, so that a periodically striated distribution of refractive indices having an envelope which is changed in accordance with a value of "$|\sin(C \cdot Z)|/|C \cdot Z|$" is formed in the core of the optical waveguide, and a phase of a light to be propagated in the direction of the light propagation is shifted at the position Z as defined below by $\pi$. $Z=m\pi/C$ ($m=$ - - - , $-3,-2,-1,1,2,3,$ - - - ) Thus, a rectangular spectrum property is obtained in a low reflection grating.

5 Claims, 11 Drawing Sheets

OPTICAL DEVICE FORMED WITH GRATING THEREIN, ADD/DROP FILTER USING SAME, AND METHOD OF FABRICATING SAME

This application is a division of application Ser. No. 08/703,629 filed Aug. 29, 1996 now allowed.

FIELD OF THE INVENTION

The invention relates to an optical device formed with a grating therein, an ADD/DROP filter using the same, and a method of fabricating the same, and more particularly to an optical device such as an optical waveguide in which a core is imprinted with an index grating, an ADD/DROP filter using such an optical waveguide, and a method of fabricating such an optical device having a core imprinted with an index grating.

BACKGROUND OF THE INVENTION

A conventional optical fiber having a core imprinted with an index grating is disclosed in the U.S. Pat. No. 5,367,588 issued on Nov. 22, 1994.

In the conventional optical fiber, the index grating is imprinted in the core using a silica glass phase grating mask which is held in close proximity to an outer periphery thereof. A UV (ultraviolet) light beam emitted from a KrF excimer laser light source is radiated to the phase grating mask at a normal incident angle, so that an interference pattern is created to be imprinted in the core of the optical fiber in accordance with the photo-inducted effect.

Such an optical fiber having a core imprinted with an index grating is used for the transmission and deflection of light power supplied to the core thereof.

An optical waveguide having a core imprinted with an index grating can be fabricated by replacing the optical fiber with an optical waveguide, and it will be explained in more detail prior to the explanation of preferred embodiments in the invention.

However, the conventional optical waveguide having the core imprinted with the index grating has disadvantages in that a low reflection spectrum property is of a square-law curve which is different from a desired rectangular property, and a high reflection spectrum property has ripples at a rising portion thereof. Consequently, a reflection power of a light signal is largely fluctuated, even if a small change occurs in a wavelength of the light signal.

SUMMARY OF THE INVENTION

Accordingly, it is an object of the invention to provide an optical device formed with a grating, an ADD/DROP filter using the same, and a method of fabricating the same in which high and low reflection spectrum properties are obtained to be rectangular.

It is another object of the invention to provide an optical device formed with a grating, an ADD/DROP filter using the same, and a method of fabricating the same in which a reflection power of a light signal is not changed, even if a wavelength of the light signal is slightly deviated.

According to the first feature of the invention, an optical device formed with a grating, comprises:

an optical waveguide comprising a core of a first refractive index and a cladding layer of a second refractive index lower than the first refractive index, the core being imbedded in the cladding layer;

a grating of a periodically striated distribution of refractive indices to be formed in the optical waveguide in a direction of a light propagation in accordance with a UV light radiation thereto;

wherein a width of the core is changed in the direction of the light propagation.

According to the second feature of the invention, an optical device formed with a low reflection grating, comprises:

an optical waveguide comprising a core of a first refractive index and a cladding layer of a second refractive index lower than the first refractive index, the core being imbedded in the cladding layer;

a grating of a periodically striated distribution of refractive indices to be formed in the optical waveguide in a direction of a light propagation in accordance with a UV light radiation thereto;

wherein a width W of the core is changed at a position Z in the direction of the light propagation in accordance with an equation as defined below, $$W = W_0 - \Delta W \cdot |\sin(C \cdot Z)|/|C \cdot Z|$$

where $W_0$ is an inherent and unchanged width of the core, $\Delta W$ is a difference between the unchanged width $W_0$ and a minimum width of the core, and C is a constant; and an envelope of said periodically striated distribution of refractive indices for the grating is changed in accordance with a value of "$|\sin(C \cdot Z)|/|C \cdot Z|$", whereby a light of a specific wavelength to be transmitted through the optical waveguide is shifted in phase at the position Z meeting an equation as defined below, $$Z = m\pi/C (m = \cdots, -3, -2, -1, 1, 2, 3, \cdots).$$

According to the third feature of the invention, an ADD/DROP filter using an optical device formed with a grating, comprises:

first and second optical waveguides formed on a substrate, such that the first and second optical waveguides are arranged to be proximate to each other at first and second portions to provide first and second optical couplers, each of the first and second optical waveguides comprising a core of a first refractive index and a cladding layer of a second refractive index lower than the first refractive index, the core being embedded in the cladding layer;

a grating of a periodically striated distribution of refractive indices to be formed in each of the first and second optical waveguides in a direction of a light propagation in accordance with a UV light radiation thereto;

wherein a width of the core is changed in the direction of the light propagation.

According to the fourth feature of the invention, a method of fabricating an optical device formed with a grating, comprises the steps of:

forming a core of a first refractive index having a width W which is changed at a position Z in a direction of light propagation in accordance with an equation as defined below, $$W = W_0 - \Delta W \cdot |\sin(C \cdot Z)|/|C \cdot Z|$$

where $W_0$ is an inherent and unchanged width of the core, $\Delta W$ is a difference between the unchanged width $w_0$ and a minimum width of the core, and C is a constant, the core being embedded in a cladding layer of a second refractive index lower than the first refractive index;

positioning a phase grating mask over the core, the phase grating mask having a grating striation which is shifted in phase at the position Z as defined below by $\pi$, $$Z = m\pi/C \, (m = \cdots, -3, -2, -1, 1, 2, 3, \cdots);$$

scanning a UV light to be radiated via the phase grating mask to the core in said direction of the light propagation in accordance with a speed determined by a value of "$1/(|\sin(C \cdot Z)|/|C \cdot z|)$", thereby providing a low reflection grating of a periodically striated distribution of refractive indices.

According to the fifthe feature of the invention, a method of fabricating an optical device formed with a low reflection grating, comprises the steps of:

forming a core of a first refractive index having a width W which is changed at a position Z in a direction of light propagation in accordance with an equation as defined below, $$W = W_0 - \Delta W \cdot |\sin(C \cdot Z)|/|C \cdot Z|$$

where $W_0$ is an inherent and unchanged width of the core, $\Delta W$ is a difference between the unchanged width $W_0$ and a minimum width of the core, and C is a constant, the core being embedded in a cladding layer of a second refractive index lower than the first refractive index;

radiating a UV light to the core to derive an envelope of a periodically striated distribution of refractive indices, the envelope changing in accordance with a value of "$|\sin(C \cdot Z)|/|C \cdot Z|$"; and radiating UV lights of a fine spot surplusly to the core at the position Z to shift a phase of a light to be propagated in the direction by $\pi$ as defined below, $$Z = m\pi/C \, (m = \cdots, -3, -2, -1, 1, 2, 3, \cdots)$$

thereby providing a low reflection grating of the periodically striated distribution of refractive indices.

BRIEF DESCRIPTION OF THE DRAWINGS

The invention will be explained in more detail in conjunction with the appended drawings, wherein.

DESCRIPTION OF THE PREFERRED EMBODIMENTS

Before explaining preferred embodiments according to the invention, the aforementioned conventional optical device in which a core of an optical waveguide is imprinted with an index grating will be explained.

Figure 1A:
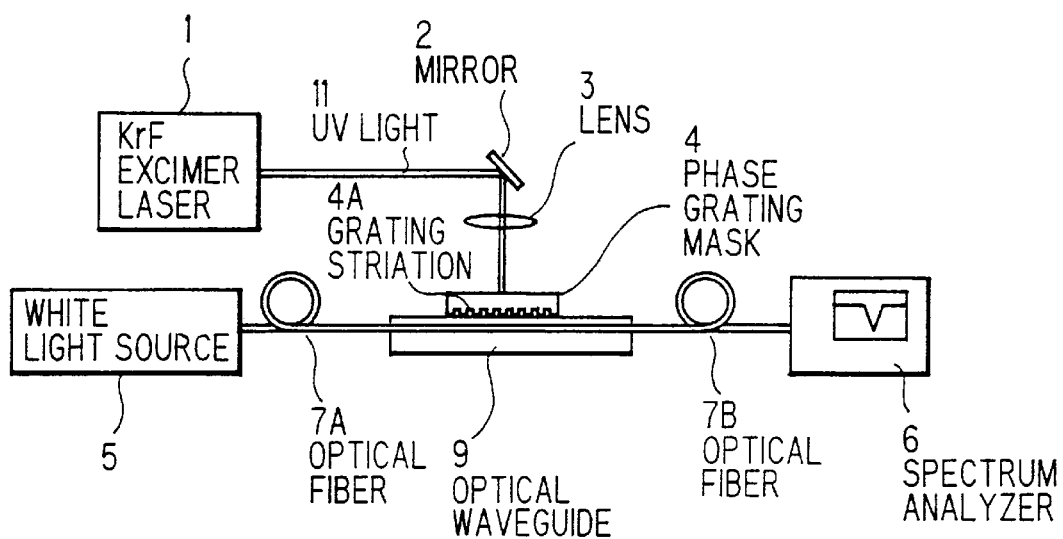
FIG. 1A is an explanatory diagram showing a conventional optical waveguide having a core imprinted with a grating.

FIG. 1A shows a fabrication system for the conventional optical device in which a core of an optical waveguide is imprinted with an index grating. The fabrication system comprises a KrF excimer laser 1 for emitting a UV light 11 having a wavelength of 248 nm, a mirror 2 for reflecting the light 11 in a predetermined direction, a lens 3 for focusing the reflected light 11 on a predetermined point, a phase grating mask 4 having a grating striation 4A of a pitch Λ for generating an interference fringe of a pitch Λ/2, a light source 5 for emitting a white light, an optical fiber 7A for transmitting the white light, an optical waveguide 9 positioned below the grating striation 4A of the phase grating mask 4 and optically coupled at an input to the optical fiber 7A, an optical fiber 7B optically coupled to an output of the optical waveguide 9, and a spectrum analyzer 6 for receiving an output light of the optical waveguide 9 via the optical fiber 7B and analyzing the spectrum of the output light.

Figure 1B:
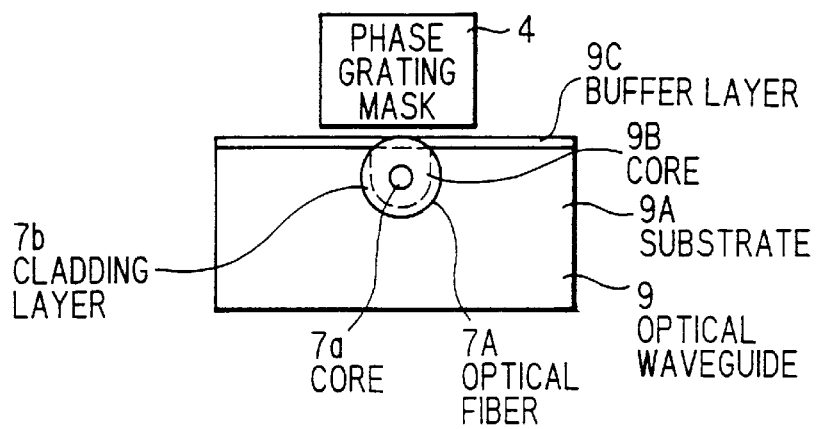
FIG. 1B is a partial side view showing the convention optical waveguide as shown in FIG. 1A.
Figure 1C:
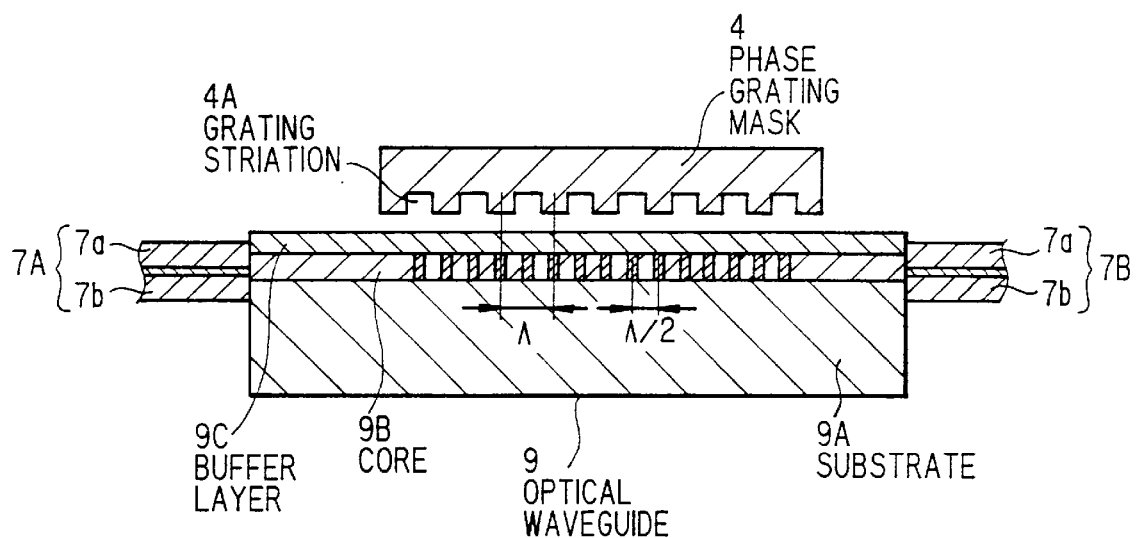
FIG. 1C is a partially enlarged view showing the conventional optical waveguide as shown in FIG. 1A.

FIGS. 1B and 1C show the relation of the phase grating mask 4, the optical waveguide 9, and the optical fibers 7A and 7B, wherein the optical waveguide 9 comprises a substrate 9A such as Si, quartz, etc. a core 9B doped with $GeO_2$, $P_2O_5$ or $B_2O_3$, and a buffer layer 9C, and each of the optical fibers 7A and 7B comprises a core 7a and a cladding layer 7b, such that the cores 7a of the optical fibers 7A and 7B are optically coupled to the input and output ends of the core 9B of the optical waveguide 9.

Figure 1D:
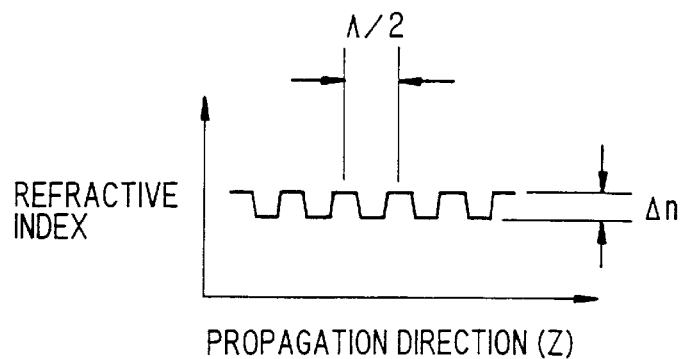
FIG. 1D is an explanatory diagram showing a refractive index along a core of the conventional optical waveguide as shown in FIG. 1A.

In operation, the UV light having a wavelength of 248 nm emitted from the KrF excimer laser 1 is radiated via the mirror 2 and the lens 3 to the phase grating mask 4, so that the interference fringe of the pitch Λ/2 is generated in accordance with the interference of plus and minus (positive and negative) first order diffraction lights by the grating striation of the pitch Λ. The interference fringe thus generated is radiated to the core 9B of the optical waveguide, so that a refractive index of the core 9B is increased dependently on the light intensity of the interference fringe in accordance with the Photo-refractive effect, as shown in FIG. 1D, wherein Δn indicates the periodically photo-induced increase of the refractive index along the light propagation direction of the core 9B in the optical waveguide 9. Consequently, a grating of a pitch Λ/2 is imprinted in the core 9B of the optical waveguide 9, as shown in FIG. 1C.

Figure 2:
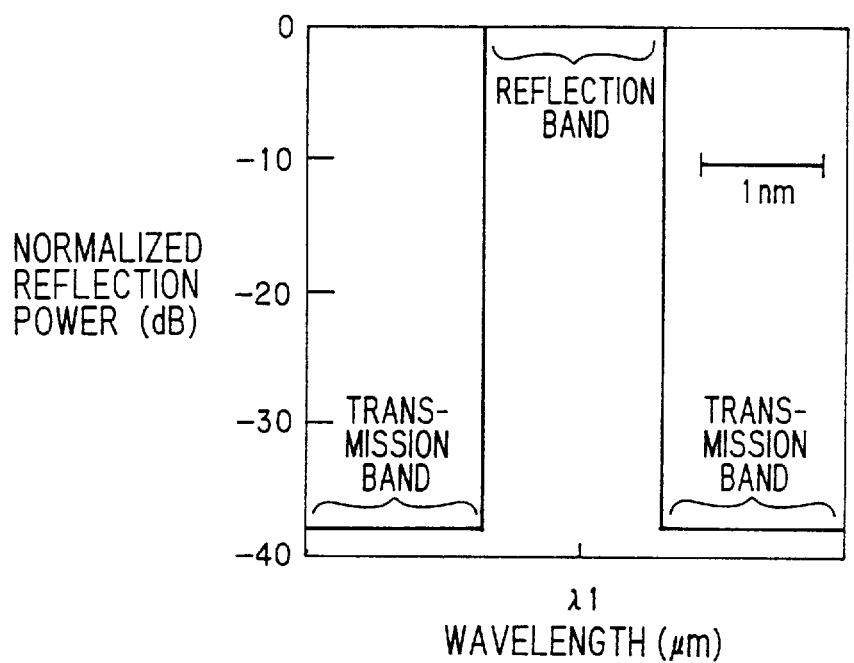
FIG. 2 is an explanatory diagram showing a desired high reflection spectrum property in the conventional optical waveguide as shown in FIG. 1A.

FIG. 2 shows an ideal spectrum property of the grating imprinted in the core 9B of the optical waveguide 9, wherein a light of a Bragg wavelength $\lambda_1$ which is determined by the below equation is selectively reflected to provide a narrow band-stop filter for an optical communication system.

$$\lambda_1 \Lambda/(2 \cdot Neff)$$

where Neff is an effective refractive index of the waveguide 9.

Figure 3:
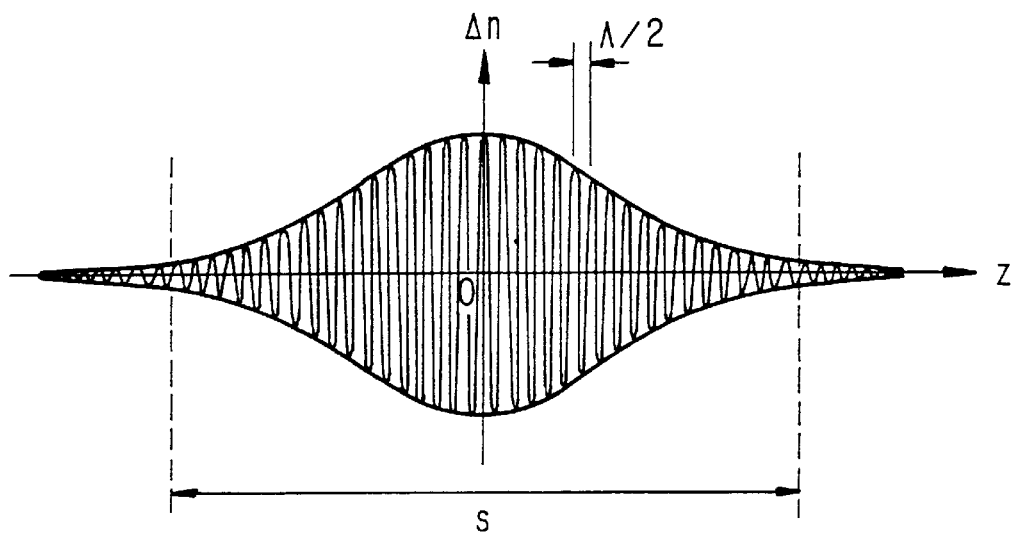
FIG. 3 is an explanatory diagram showing a desired envelope for refractive indices of the core in the conventional optical waveguide as shown in FIG. 1A.

Such an ideal spectrum in which a normalized reflection power is as large in a loss of a light power to be reflected as −38 dB to be constant in a band-pass wavelength region, that is, a light propagated through the core 9B of the optical waveguide 9 is transmitted without any substantial reflection, while the normalized reflection power is sharply risen-up, as a wavelength of the light transits the band-pass wavelength region to a band-stop wavelength region, in which the normalized reflection power is as low in the loss of the light power to be reflected as 0 dB, that is, the light is reflected without any substantial transmission via the core 9B of the optical waveguide 9, is considered to be realized by radiating a light beam having an intensity distribution of Gaussian type to the phase grating mask 4, thereby providing a modulation degree of the grating imprinted in the core 9B of the optical waveguide 9 which will be a pattern of Gassinan type, as a shown in FIG. 3, wherein S indicates a size of the Gaussian type light beam which is obtained by placing a spatial amplitude filter in the path of the light 11.

Figure 4:
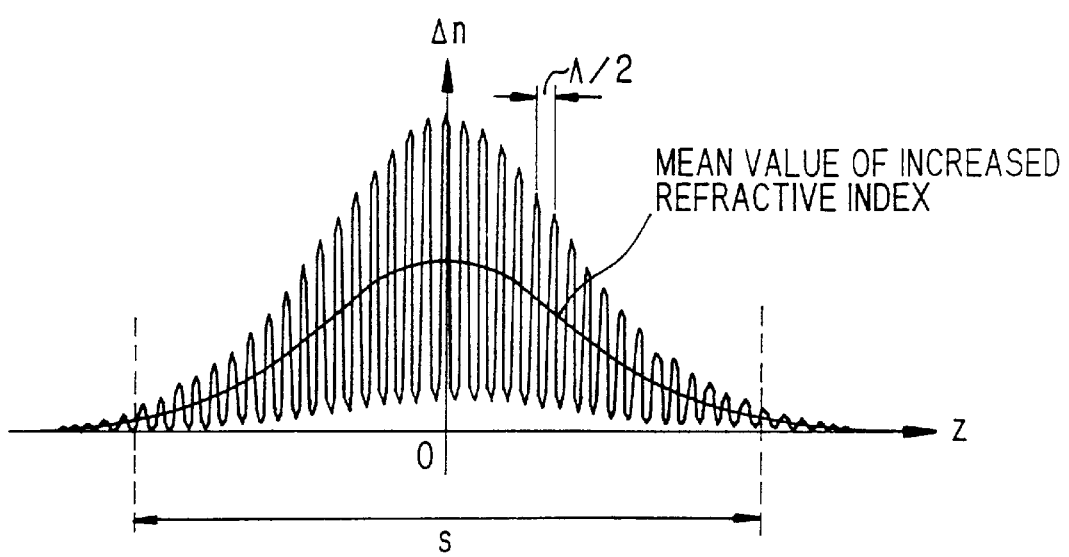
FIG. 4 is an explanatory diagram showing a practically realized envelope for refractive indices of the core in the conventional optical waveguide as shown in FIG. 1A.
Figure 5:
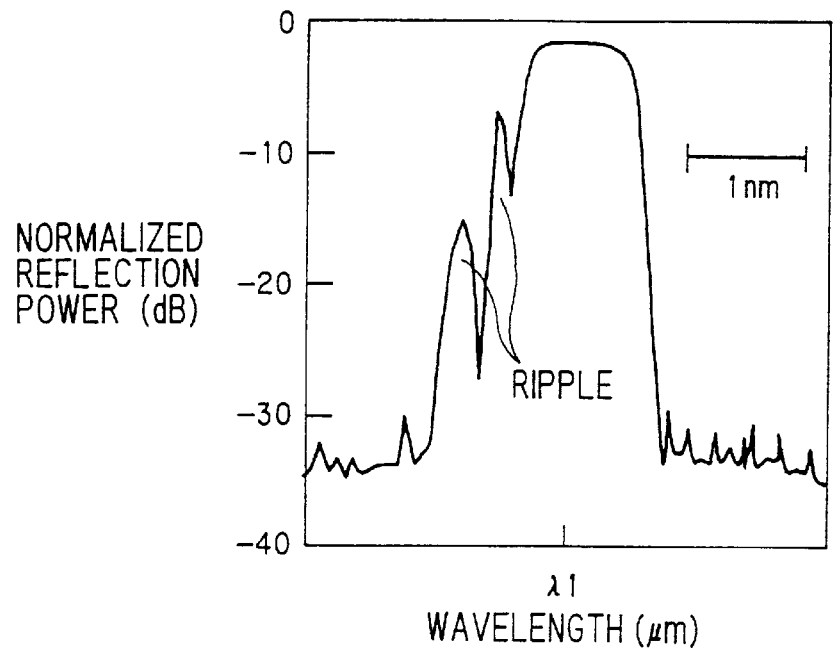
FIGS. 5 and 6 are explanatory diagrams showing normalized reflection powers dependent on wavelengths of light signals supplied to the conventional optical waveguide as shown in FIG. 1A.
Figure 6:
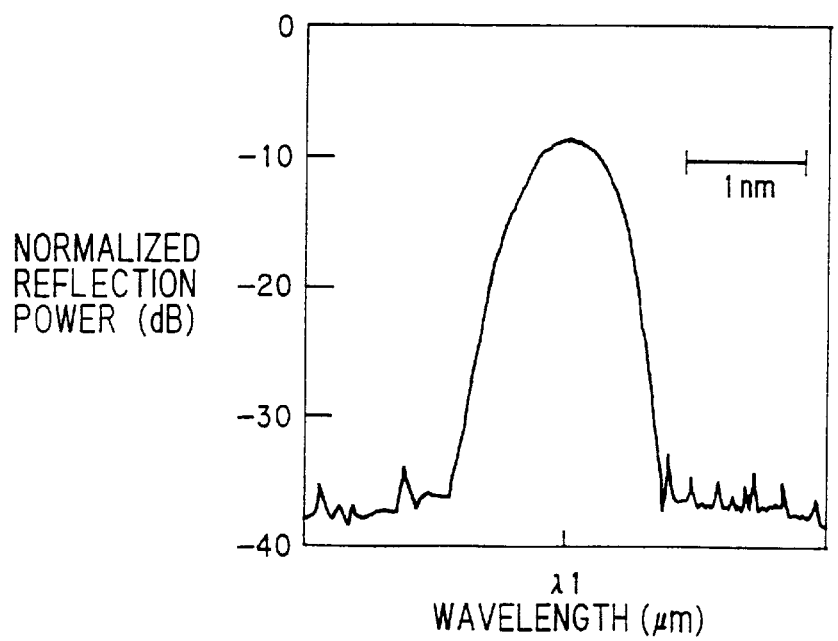

In the conventional optical waveguide having the core imprinted with the index grating, however, there are disadvantages in that a mean value of refractive indices of the core is increased, as shown in FIG. 4, although the modulation degree of Gaussian type is obtained for the index grating, when the UV light of Gaussian type is radiated to the optical waveguide 9, so that ripples are generated on the lower wavelength side of the band-stop wavelength region, as shown in FIG. 5, to result in the fluctuation of a reflection power in accordance with the slight change of a wavelength of a transmission light, and that a reflection spectrum property is in the shape of a square curve for a low reflection grating, as shown in FIG. 6, when the UV light of Gaussian type is radiated to the optical waveguide 9.

Figure 7A:
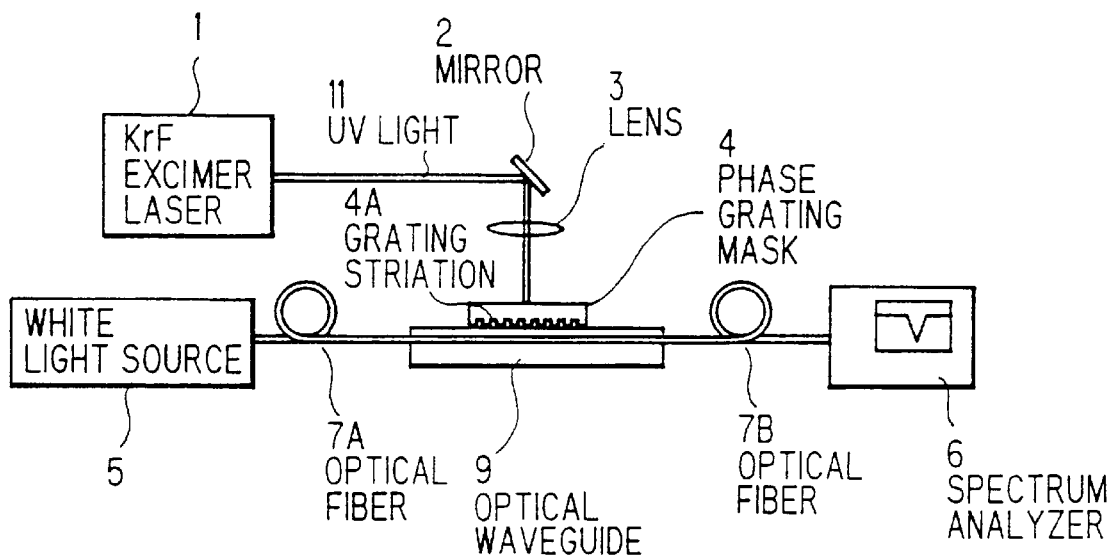
FIGS. 7A and 7B are explanatory diagrams showing an optical device in a preferred embodiment according to the invention.

Next, an optical device formed with a grating therein in a preferred embodiment according to the invention will be explained in FIGS. 7A and 7B, wherein like parts are indicated by like reference numerals as used in FIGS. 1A to 1C.

Figure 7B:
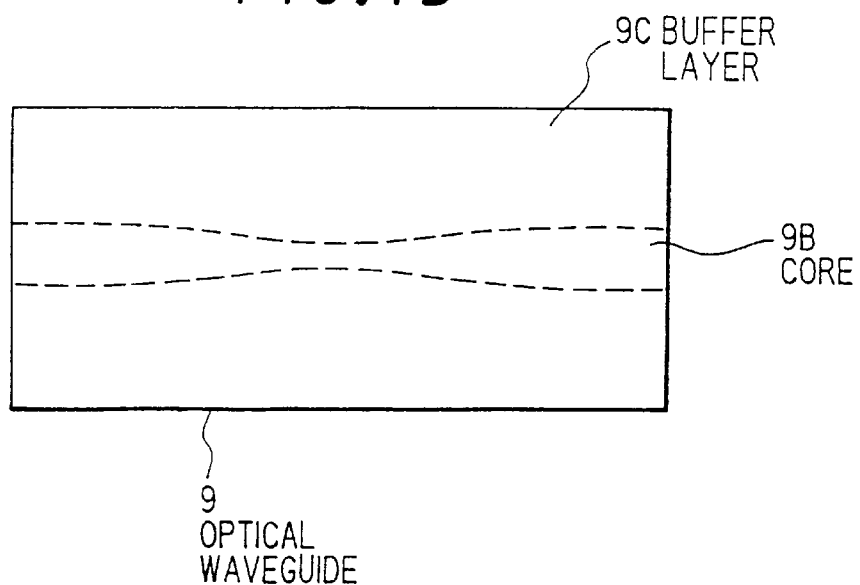

In the preferred embodiment, the optical device is for an optical waveguide 9 having a core 9B which is shown in FIG. 7B. As a matter of course, the optical waveguide 9 may be replaced by an optical fiber comprising a core and a cladding layer.

The core 9B of the optical waveguide 9 is of a width W at a position Z in the direction of a light propagation as defined by the equation (1).

$$W = W_0 - \Delta W \cdot exp(-Z^2/S^2) \quad (1)$$

where $W_0$ is an inherent and unchanged width of the core 9B, ΔW is a decreased width of the core 9B, and S is a diameter of a light beam of Gaussian type to be radiated to a phase grating mask 4.

Figure 8A:
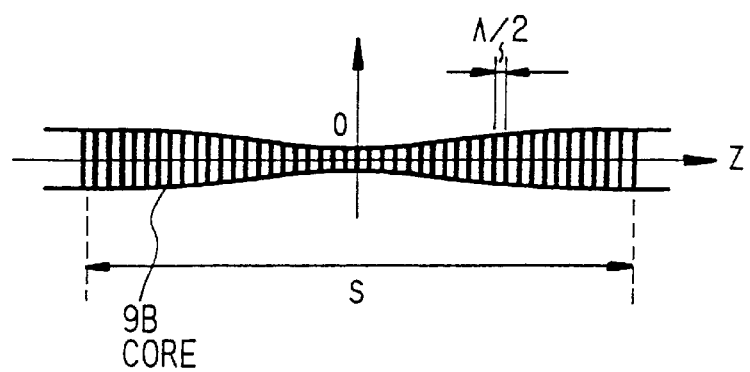
FIGS. 8A to 8D are explanatory diagrams showing a configuration of a core and refractive indices thereof in the optical device in the preferred embodiment according to the invention.

In FIG. 8A, the width of the core 9B is decreased, as a distance to the center point 0 is decreased. As shown therein, the core 9B is imprinted with an index grating of a pitch Λ/2.

Figure 8B:
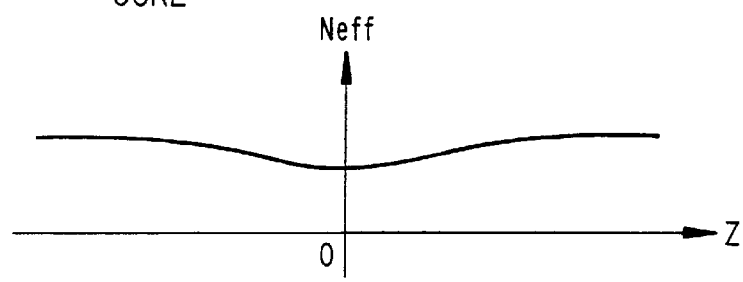

In FIG. 8B, an effective refractive index Neff of the optical waveguide 9 is changed proportionally to the width of the core 9B to derive a Gaussian distribution.

Figure 8C:
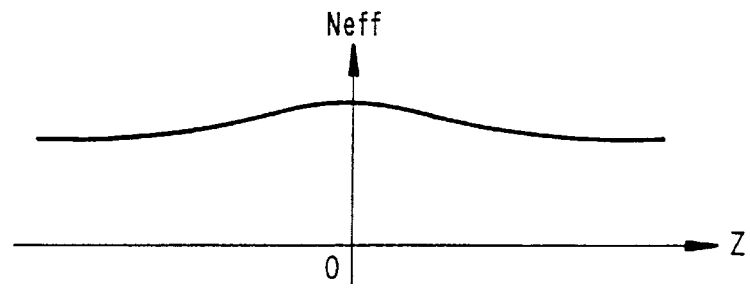

In FIG. 8C, a mean value of refractive indices to be increased by the radiation of the UV light is maximum at the center point 0.

Figure 8D:
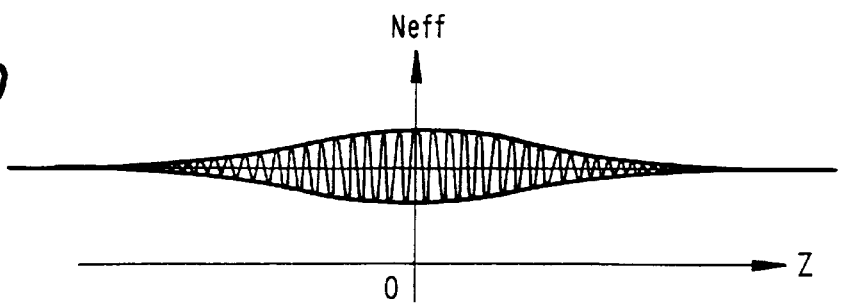

In FIG. 8D, the decreased width ΔW of the core 9B is optimized to derive a flat mean value of refractive indices of the core 9B in the direction of the light propagation in accordance with the cancellation of the increase and decrease of the refractive indices as shown in FIGS. 8B and 8C.

In an experiment, the core 9B of the optical waveguide 9 is formed by doping $GeO_2$ into a predetermined region of a Si substrate 9A. The core 9B is structured to have the width W of 5 μm at the center point (Z=0) and the unchanged width $W_0$ of 6 μm, thereby deriving the decreased width amount ΔW of 1 μm. A UV light of Gaussian distribution emitted from the KrF excimer laser 1 is radiated to the phase grating mask 4 in accordance with a beam spot S of 0.8 mm, so that the maximum value of photo-induced refractive indices Δn is 0.1%. In this optical waveguide 9, a specific refractive index of the core 9B is 0.5%, and a pitch Λ/2 of the grating imprinted in the core 9B is 0.5373 μm. The width of the core 9B is changed with 1 μm for a light propagation distance of 400 μm, so that a core width-changing rate is obtained to be 0.0025 rad (1 μm/400 μm), while a length of the core 9B representing a taper of Gaussian type is 0.8 mm which is the same as the beam spot size S.

Figure 9:
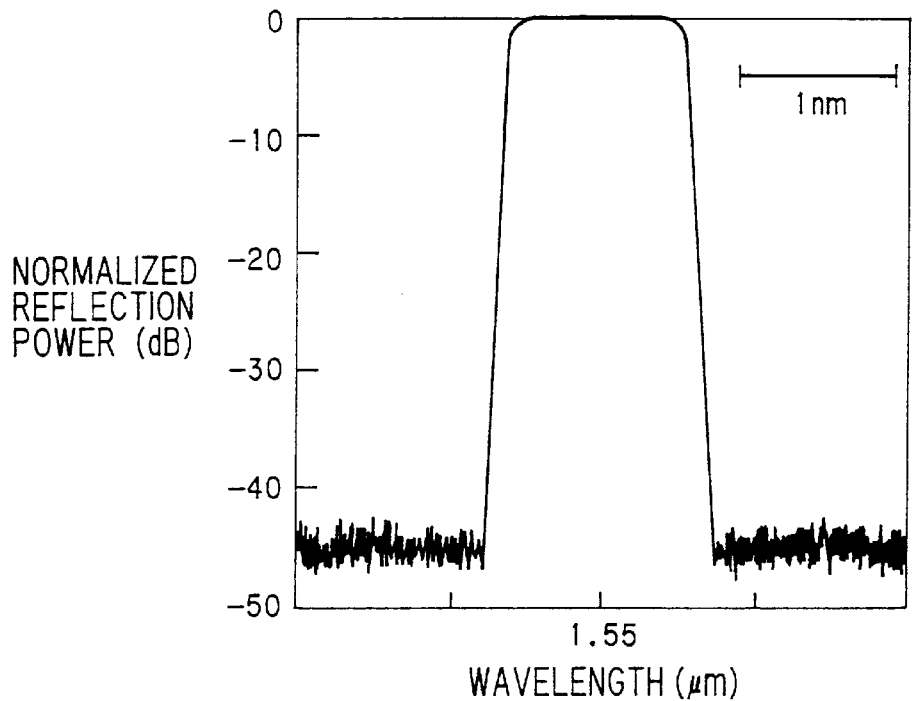
FIG. 9 is an explanatory diagram showing a normalized reflection power dependent on a wavelength of a light signal supplied to the optical device in the preferred embodiment according to the invention.

FIG. 9 shows a spectrum property obtained in the optical waveguide 9 having the core 9B imprinted with the index grating in the preferred embodiment, wherein this spectrum property is similar to a rectangular spectrum property.

Figure 10:
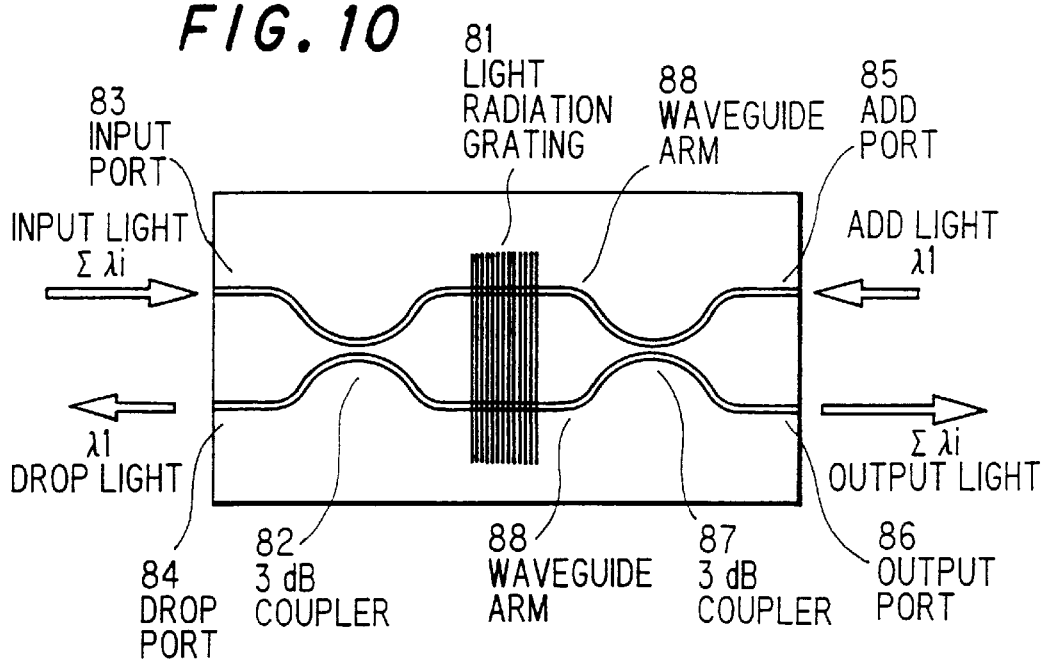
FIG. 10 is an explanatory diagram showing an ADD/DROP filter using an optical device in a preferred embodiment according to the invention.

FIG. 10 shows an ADD/DROP filter using an optical device formed with a grating therein in a preferred embodiment according to the invention. The ADD/DROP filter is a Mach-Zehnder interferometer, and comprises first and second 3 dB couplers 82 and 87, a pair of optical waveguide arms 88 for connecting the first and second 3 dB couplers 82 and 87, and optical waveguides for connecting an input port 83 and a drop port 84 to the first 3 dB coupler 82, and an add part 85 and an output port 86 to the second 3 dB coupler 87, wherein a light radiation grating 81 which is discussed in the aforementioned preferred embodiment is imprinted in the optical waveguide arms 88.

In operation, a wavelength division-multiplexed (WDM) light signal Σλi is supplied to the input port 83, and is equally divided at the first 3 dB coupler 82 to be propagated through the optical waveguide arms 88, so that light signals of a specific wavelength λ, among the WDM light signals λ thus divided are reflected to be combined at the first 3 dB coupler 82 by the light radiation grating 81. Then, the combined light signal of the wavelength $\lambda_1$ is radiated from at the drop port 84. On the other hand, the WDM light signals Σλi excluding the reflected light signals of the wavelength $\lambda_1$ are transmitted through the optical waveguide arms 88 to be combined at the second 3 dB coupler 87. Then, the combined WDM light signal Σλi is radiated from the output port 86.

On the contrary, when a light signal of the specific wavelength $\lambda_1$ is supplied to the add port 85, the supplied light signal is equally divided to be propagated through the optical waveguide arms 88, and is reflected to be propagated through the optical waveguide arms 88 back to the second 3 dB coupler 87 by the light radiation grating 81. At the second 3 dB coupler 87, the reflected light signals are combined to be radiated from the output port 86.

In this ADD/DROP filter, a pitch Λ/2 of the light radiation grating 81 may be changed dependently on a wavelength of a light signal to be added or dropped, and a light signal of a specific wavelength can be added to dropped with a low loss and a suppressed cross-talk with adjucent channels.

Figure 11:
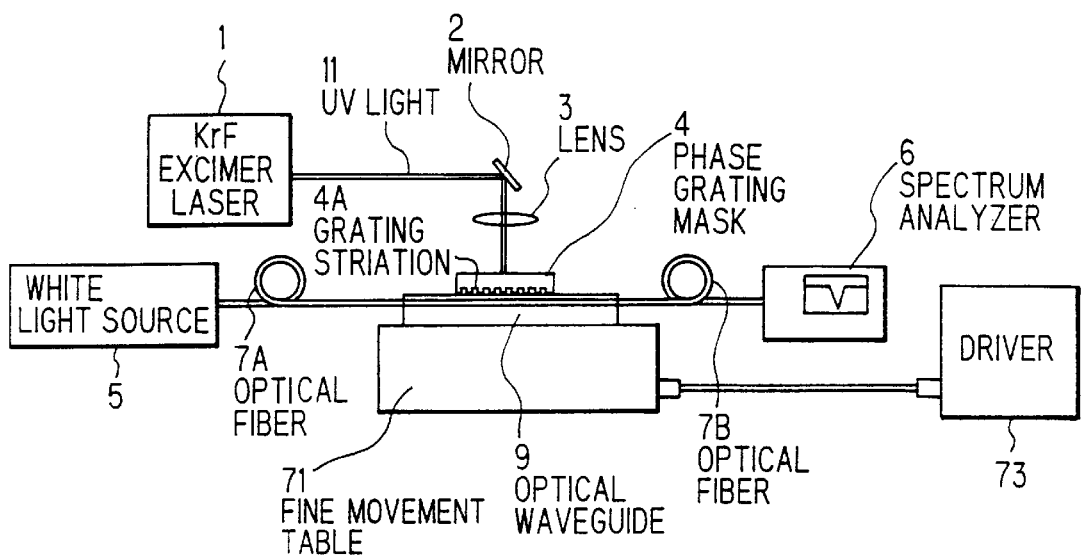
FIG. 11 is an explanatory diagram showing an optical device in a preferred embodiment according to the invention.

Another optical device formed with a grating therein in another preferred embodiment according to the invention will be explained in FIG. 11, wherein like parts are indicated by like reference numerals as used in FIGS. 1A to 1C, and 7A and 7B.

In this preferred embodiment, the optical device is for an optical waveguide 9 having a core which is shown in the former preferred embodiment. As explained before, the optical waveguide 9 may be replaced by an optical fiber comprising a core and a cladding layer.

Figure 12:
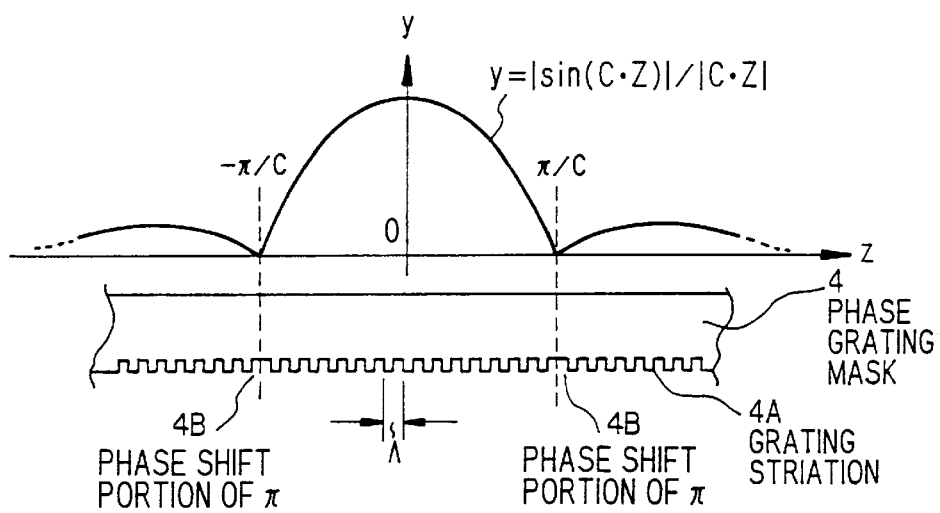
FIG. 12 is an explanatory diagram showing a phase grating mask used in the optical device as shown in FIG. 11.

The optical waveguide 9 is placed on a fine movement table 71 which is finely moved in the direction Z of a light propagation by a driver 73 which is controlled by a computer (not shown), and a phase grating mask 4 has a grating striation 4A formed with phase shift portions 4B of π as shown in FIG. 12. The phase shift portions 4B of π are provided at positions which are determined by the equation (2).

$$Y = |\sin(C \cdot Z)|/|C \cdot Z| \quad (2)$$

where C is a constant.

The positions correspond to a zero value (y=0) of the equation (2), that is, a phase of a transmission light of a specific wavelength is shifted at points meeting the equations (3) by π.

$$Z = m\pi/C \quad (3)$$

where m is one of plus and minus integer (m= - - - , -3, -2, -1, 1, 2, 3, - - -)

In order to fabricate a low reflection grating, it is derived from detailed calculations that a coupling coefficient which is proportional to the increase of the grating striation propagation index is required to be proportional to "sin (z)/(z)" which is a value of the value of the equation (2), assuming that the constant C is one (c=1) in the equation (2). The value of the equation (2) takes plus and minus ones. In practical, however, it is impossible to fabricate a light radiation grating having a minus value in the change of a refractive index.

In this regard, the phase grating mask 4 is formed with the phase shift portions 4B of π in the grating striation 4A at the positions where the value of "sin (z)/(z)" changes between plus and minus values. This provides the same effect as a monotonous grating having a minus value in the change of a refractive index.

Figure 13A:
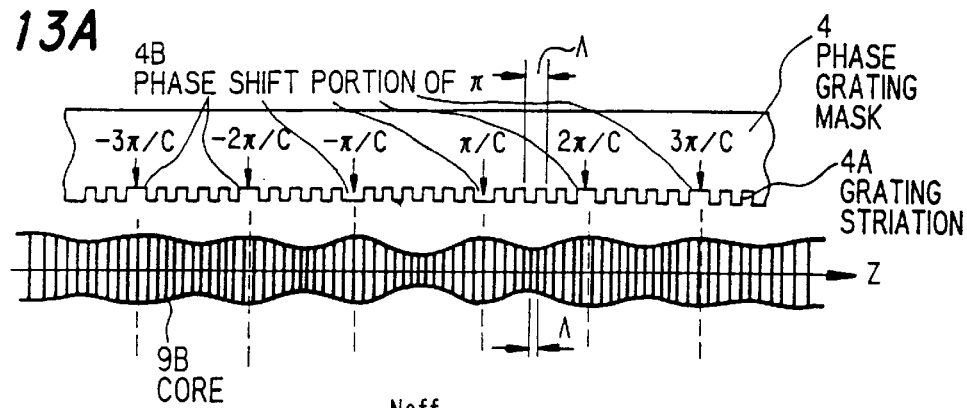
FIGS. 13A to 13D are explanatory diagrams showing a configuration of a core and refractive indices thereof in the optical device as shown in FIG. 11.

In FIG. 13A, the core 9B of the optical waveguide 9 is wider at positions corresponding to the phase shift portions 4B of the grating striation 4A of the phase grating mask 4. In more detail, the width of the core 9B is defined by the equation (4).

$$W = W_0 - \Delta W \cdot |\sin(C \cdot z)|/|(C \cdot z)| \quad (4)$$

In operation, a UV light 11 having a beam spot of approximately 50 μm is scanned over the phase grating mask 4 and the core 9B of the optical waveguide 9 with a scanning speed proportional to "1/(|sin (C·Z)|/|C·Z|)." This scanning of the UV light 11 is carried out by the fine movement table 7 which is finely moved in the direction Z of the light propagation by the driver 73.

Figure 13B:
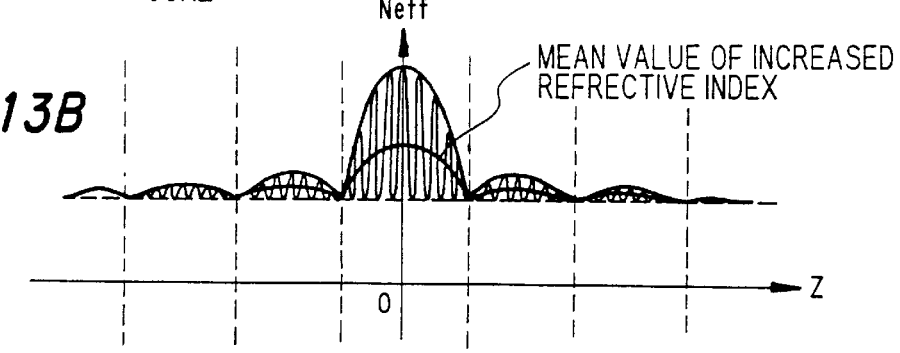

In FIG. 13B, an envelope of the increase of refractive indices is obtained to be approximately proportional to "|sin(C·Z)|/|C·Z|", because the increase of a refractive index is proportional to a radiation time of the UV light 11.

Figure 13C:
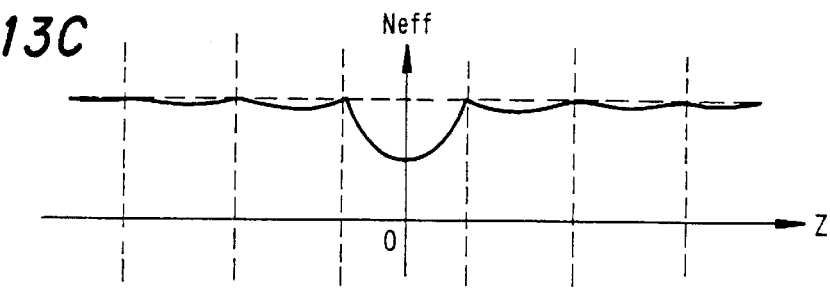

In FIG. 13C, an effective refractive index Neff of the optical waveguide 9 is changed dependently on the width of the core 9B. The change of the effective refractive index Neff of the optical waveguide 9 is determined to compensate the mean value of the increased refractive indices (FIG. 13B) by optimizing the width of the core 9B in accordance with the equation (4).

Figure 13D:
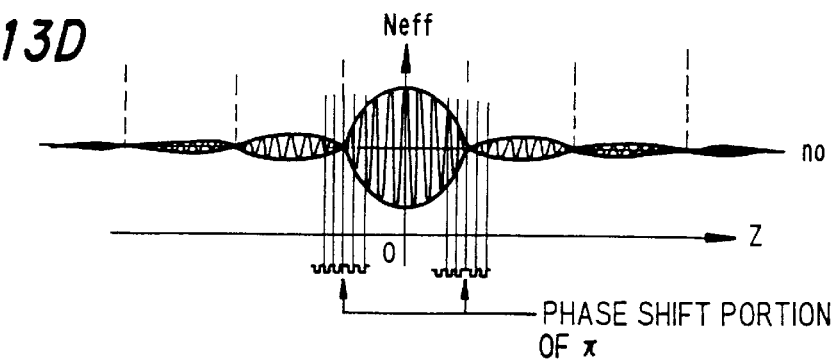

In FIG. 13D, the mean value of the refractive indices (FIG. 13B) and the effective refractive index Neff are canceled to derive an index grating of a low reflection spectrum property.

In an experiment, an excimer laser light of Gaussian distribution is scanned to be radiated via the phase grating mask 4 to the core 9B of the optical waveguide 9 to derive the maximum value of 0.023% for a photo-induced refractive index Δn, so that a specific refractive index of the core 9B is 0.5%, and a pitch Λ/2 and a length of the imprinted index grating are 0.5373 μm and 40 mm, respectively. The width of the core 9B is set to meet the below parameters.

$$W_0 = 6 \mu M, \Delta W = 1 \mu m, \text{ and } C = 4/\mu m.$$

Figure 14:
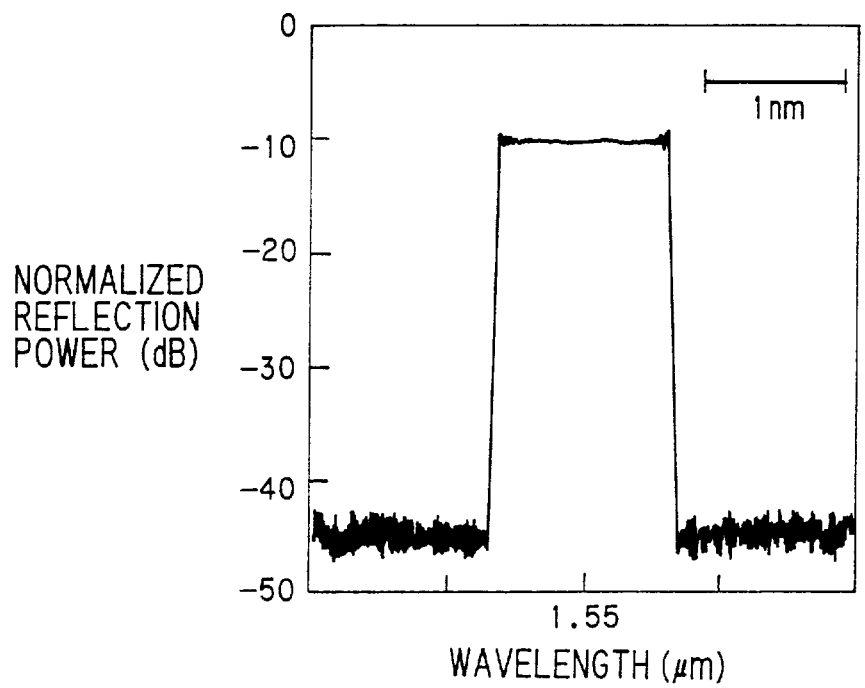
FIG. 14 is an explanatory diagram showing a normalized reflection power dependent on a wavelength of a light signal supplied to the optical device as shown in FIG. 11.

The optical waveguide 9 having the core 9B imprinted with the grating provides a low reflection spectrum property as shown in FIG. 14, wherein a light power of approximately −10 dB (10%) is reflected with a rectangular spectrum pattern.

Figure 15:
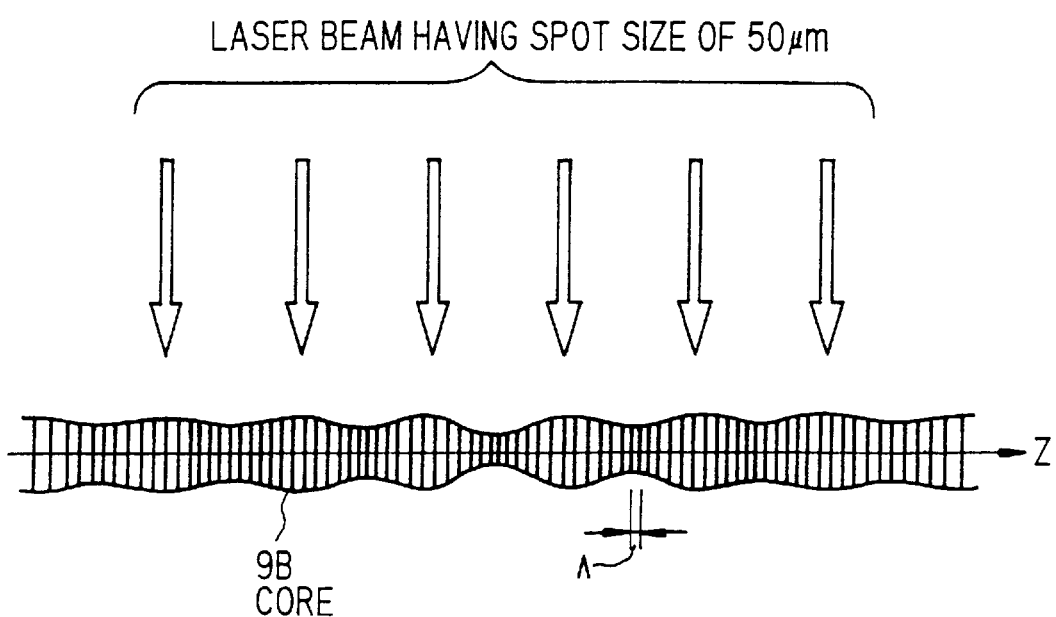
FIG. 15 is an explanatory diagram showing a method of fabricating a core of an optical waveguide in the optical device as shown in FIG. 11.

FIG. 15 shows another method of providing a grating imprinted in the core 9B of the optical waveguide 9 with no phase grating mask and the same effect as a monotonous grating having a minus value in the change of a refractive index.

In this method, an index grating is first imprinted in the core 9B of the optical waveguide 9 in accordance with a UV light radiation via the phase grating mask 4 to the core 9B. Then, laser beams each having a spot size of 50 μm are surplusly radiated to the core 9B at positions where a value of "sin (C·Z)/(C·Z)" is changed minus to plus ones and plus to minus ones, that is, points meeting the equation "Z=mπ/C(m= - - - , −3,−2,−1,1,2,3, - - -)."

In accordance with this surplus light radiation, a phase of a transmission light is shifted by the equation (5)

$$\theta = k_0 \cdot Neff \cdot w_s \cdot \Delta n \quad (5)$$

where θ is a phase shift amount, $k_0$ is the number of waves in vacuum, Neff is an effective refractive index of the optical waveguide 9, Ws is a spot size of the laser beams, and Δn is a change of a refractive index in accordance with the surplus light radiation.

When the phase shift amount θ is π, the same result as the provision of the phase grating mask 4 having the phase shift portions 4B of π is obtained, even if the phase grating mask 4 is not used.

In this method, the smaller the spot size of the laser beams is, the better the phase shift result is.

When the phase shift amount θ is π, the equation (5) is modified below.

$$Ws = \pi/(k_0 \cdot Neff \cdot \Delta n) \quad (6)$$

As apparent from the equation (6), the spot size Ws of the laser beams is dependent on the refractive index change Δn.

In a preferred embodiment, the spot size of 50 μm is determined in accordance with a wavelength λ of 1.55 μm, an effective refractive index Neff of 1.45, and a reflective index change of 0.0107.

In this preferred embodiment in which the surplus radiation of the laser beams is used, a phase grating mask 4 having no phase shift portion 4B of π, but having the ordinary striation 4A may be used for the scanning of a light radiation in the direction of light propagation. In such a case, a periodical striated distribution of refractive indices which is similar to that as shown in FIG. 13A is obtained to have an envelope determined by the value of "|sin (C·Z)|/|C·Z|.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An ADD/DROP filter using an optical device formed with a grating therein, comprising:

first and second optical waveguides formed on a substrate, such that said first and second optical waveguides are arranged to be proximate to each other at first and second portions to provide first and second optical couplers, each of said first and second optical waveguides comprising a core of a first refractive index and a cladding layer of a second refractive index lower than said first refractive index, said core being embedded in said cladding layer;

a grating of a periodically striated distribution of refractive indices to be formed in each of said first and second optical waveguides in a direction of a light propagation in accordance with a UV light radiation thereto, wherein a width of said core is changed in said direction of said light propagation.

2. The ADD/DROP filter as defined in claim 1, wherein:

a mean value of said refractive indices is increased in accordance with said UV light radiation, a UV light of said UV light radiation having a predetermined spatial distribution of a light intensity in said direction of said light propagation; and p1 said width of said core is changed to be taper, thereby cancelling said mean value.

3. The ADD/DROP filter as defined in claim 1, wherein:

said core is doped with one of $GeO_2$, $P_2O_5$ and $B_2O_3$.

4. The ADD/DROP filter as defined in claim 1, wherein:

a rate of changing said width of said core is set by a changing amount of less than 1 μm for said width relative to a distance of 100 μm in said direction of said light propagation.

5. The ADD/DROP filter as defined in claim 2, wherein:

said predetermined spatial distribution of said UV light is Gaussian type.

* * * * *